(12) United States Patent
Deville

(10) Patent No.: US 9,040,466 B2
(45) Date of Patent: May 26, 2015

(54) OXYGEN SCAVENGER COMPOSITIONS FOR COMPLETION BRINES

(71) Applicant: Halliburton Energy Services, Inc., Houston, TX (US)

(72) Inventor: Jay Paul Deville, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 13/784,755

(22) Filed: Mar. 4, 2013

(65) Prior Publication Data

US 2013/0178398 A1     Jul. 11, 2013

Related U.S. Application Data

(62) Division of application No. 12/947,540, filed on Nov. 16, 2010.

(51) Int. Cl.

| | |
|---|---|
| *C09K 8/86* | (2006.01) |
| *C09K 8/06* | (2006.01) |
| *C09K 8/54* | (2006.01) |
| *C23F 11/10* | (2006.01) |
| *C23F 11/12* | (2006.01) |
| *C23F 11/14* | (2006.01) |
| *C09K 8/08* | (2006.01) |

(52) U.S. Cl.
CPC ... *C09K 8/86* (2013.01); *C09K 8/06* (2013.01); *C09K 8/54* (2013.01); *C23F 11/10* (2013.01); *C23F 11/124* (2013.01); *C23F 11/142* (2013.01); *C09K 8/08* (2013.01)

(58) Field of Classification Search
CPC .......... C09K 8/524; C09K 8/00; C09K 8/584; C09K 8/588; C09K 8/68; C09K 3/30; C09K 5/045; C09K 8/06; C09K 8/12; C09K 8/487; C09K 8/54; C09K 8/5751; C09K 8/62; C09K 8/685; C09K 8/706; C09K 8/80; C09K 8/035; C09K 8/845; C09K 8/88; C09K 15/322; C09K 15/20; C09K 5/048; C09K 8/08; C09K 8/5083; C09K 8/512; C09K 8/86; C09K 8/887; C09K 8/882

See application file for complete search history.

(56) References Cited

U.S. PATENT DOCUMENTS

| | | | | |
|---|---|---|---|---|
| 4,539,122 | A | * | 9/1985 | Son et al. ........................ 507/260 |
| 4,681,737 | A | * | 7/1987 | Walker et al. ................... 422/16 |
| 4,784,778 | A | | 11/1988 | Shin |
| 4,784,779 | A | * | 11/1988 | Dadgar ......................... 507/266 |
| 4,949,790 | A | | 8/1990 | Dill et al. |
| 5,178,796 | A | | 1/1993 | Gewanter et al. |
| 5,622,919 | A | | 4/1997 | Brezinski et al. |
| 5,922,653 | A | | 7/1999 | Ahmed et al. |
| 6,225,261 | B1 | | 5/2001 | Brezinski et al. |
| 6,315,045 | B1 | * | 11/2001 | Brezinski ....................... 166/300 |
| 7,219,735 | B2 | | 5/2007 | Smith et al. |
| 7,268,100 | B2 | | 9/2007 | Kippie et al. |
| 2006/0194700 | A1 | | 8/2006 | Gatlin et al. |
| 2008/0287325 | A1 | * | 11/2008 | Thompson et al. ............ 507/273 |
| 2009/0026144 | A1 | * | 1/2009 | Hicks et al. .................... 210/696 |

FOREIGN PATENT DOCUMENTS

DE          4337704      *    5/1995

OTHER PUBLICATIONS

Potassium Chloride Brine System Specification, MiSwaco.*
Sodium Chloride Brine System Specification, MiSwaco.*
Material Safety Data Sheet, AquaPhoenix Scientific, Inc.*
Deville, J. P. et al., "A New Oxygen Scavenger Suitable for High-Temperature Applications" AADE-11-NTCE-22 Paper presented at the AADE National Technical Conference, Apr. 2011, 8 pages.

* cited by examiner

*Primary Examiner* — Susannah Chung
*Assistant Examiner* — Kumar R Bhushan
(74) *Attorney, Agent, or Firm* — Holly Soehnge; Baker Botts L.L.P.

(57) ABSTRACT

An oxygen scavenger for completion brines effective and stable in high temperature subterranean formations. In one embodiment, the scavenger contains erythorbate and alkylhydroxlyamine.

8 Claims, 4 Drawing Sheets

OXYGEN SCAVENGER COMPOSITIONS FOR COMPLETION BRINES

RELATED APPLICATION

This application is a division of U.S. patent application Ser. No. 12/947,540, filed Nov. 16, 2010, pending.

BACKGROUND OF THE INVENTION

1. Field of the Invention

The present invention relates to compositions for removing dissolved oxygen from drilling and completion fluids for use in high temperature subterranean formations.

2. Description of Relevant Art

Completion operations normally include perforating the casing and setting the tubing and pumps prior to, and to facilitate, initiation of production in hydrocarbon recovery operations. The various functions of drill-in, completion and workover fluids include controlling well pressure, preventing the well from blowing out during completion or workover, and preventing the collapse of the well casing due to excessive pressure build-up. The fluid is meant to help control a well without damaging the producing formation or completion components. Specific completion fluid systems are selected to optimize the well completion operation in accordance with the characteristics of a particular geological formation. "Drill-in" drilling fluids, used in drilling through a producing zone of a hydrocarbon bearing subterranean formation, and completion fluids, used in completing or recompleting or working over a well, are typically comprised of clear brines. As used herein, a "producing zone" is understood to be a portion of a hydrocarbon bearing subterranean formation that contains hydrocarbons, and thus a wellbore penetrating such portion of the formation is likely to receive hydrocarbons from the zone for production. A "producing zone" may alternatively be called a "production zone" or a "pay zone."

Seldom is a regular drilling fluid suitable for completion operations due to its solids content, pH and ionic composition. Drill-in fluids can, in some cases be suitable for both drilling and completion work. Fluids can contain suspended solid matter consisting of particles of many different sizes. Some suspended material will be large enough and heavy enough to settle rapidly to the bottom of a container if a liquid sample is left to stand (the settable solids). Very small particles will settle only very slowly or not at all if the sample is regularly agitated or the particles are colloidal. These small solid particles cause the liquid to appear turbid (i.e., cloudy or hazy). The potential of particle invasion and/or filter cake buildup to damage a formation by reducing permeability in the producing zone has been recognized for many years. If permeability gets damaged, it cannot be 100 percent restored by any means. Loss in permeability means a decrease in anticipated production rates and ultimately in a decrease in production overall.

Thus, the importance of using clear completion and workover fluids to minimize formation damage is now well recognized and the use of clear heavy brines as completion fluids is now widespread. Most such heavy brines used by the oil and gas industry are calcium halide brines, particularly calcium chloride or calcium bromide brines, sodium halide brines, particularly sodium chloride or sodium bromide, or formate brines.

As used herein, the terms "completion fluids" and "completion brines" shall be understood to be synonymous with each other and to include drill-in and workover fluids or brines as well as completion fluids or brines, unless specifically indicated otherwise.

Completion brines often contain dissolved and entrained air which enters the brines as it is circulated through the drill string into the well bore penetrating a subterranean formation. The presence of oxygen from the air in the brines drastically increases the rate of corrosion and deterioration of metal surfaces in the drill string, casing and associated equipment as compared to such fluids which do not contain oxygen. To minimize such corrosion, and the presence of oxygen, completion brines are frequently treated with oxygen scavengers.

Generally, oxygen scavengers used in completion brines are reducing agents that will react out most of the oxygen dissolved in the brine. Common oxygen scavenger chemistries include sulfites, hydrazine, and erythorbate. Sulfites are not generally used in completion brines because the oxidized product, sulfate, can precipitate and lead to other forms of corrosion.

A preferred oxygen scavenger for completion brines is sodium erythorbate, because it reduces the oxygen concentration in a variety of completion brines without causing precipitation seen with sulfites. However, erythorbate tends to decompose at elevated temperatures. At temperatures of about 275° F. and higher, sodium erythorbate in brine decomposes resulting in transformation of the brine from a desired clear and colorless fluid to an undesired dark, brown opaque fluid. This transformation of the brine is troublesome as it gives rise to concerns that the brine may be potentially corrosion-inducing or damaging to the formation. As used herein, "clear and colorless" with respect to brine or completion fluids means that the fluid has an "NTU" (nephelometric turbidity unit) less than about 20. NTU is an American Petroleum Institute accepted unit related to the suspended solids in a brine (higher NTU=more suspended solids), based on how much light is scattered by a sample. The procedure for determining NTU is described in API RP 13J, "Testing of Heavy Brines," incorporated herein by reference, and is a procedure well known to those of ordinary skill in the art.

Thus, while there are a number of oxygen scavengers for drilling fluids in the marketplace, there continues to be a need for oxygen scavengers having utility in completion brines for use at high temperatures.

SUMMARY OF THE INVENTION

According to the invention, dissolved oxygen is removed from an aqueous fluid, particularly a completion fluid or brine, by contacting the aqueous oxygen-containing fluid with an oxygen scavenger comprising erythorbate and alkylhydroxylamine. This oxygen scavenger is effective even at high temperatures, and does not break down or result in the discoloration of the fluid or transformation of the fluid from, for example, clear and colorless, to dark and opaque. The invention includes a completion fluid for use in high temperature subterranean formations that comprises a clear, colorless brine and an erythorbate and alkylhydroxylamine oxygen scavenger, and a method of completing a wellbore in such a subterranean formation employing such a completion fluid. In the invention, erythorbic acid, ascorbic acid or ascorbate may be substituted for erythorbate.

DETAILED DESCRIPTION OF PREFERRED EMBODIMENTS

Figure 1:
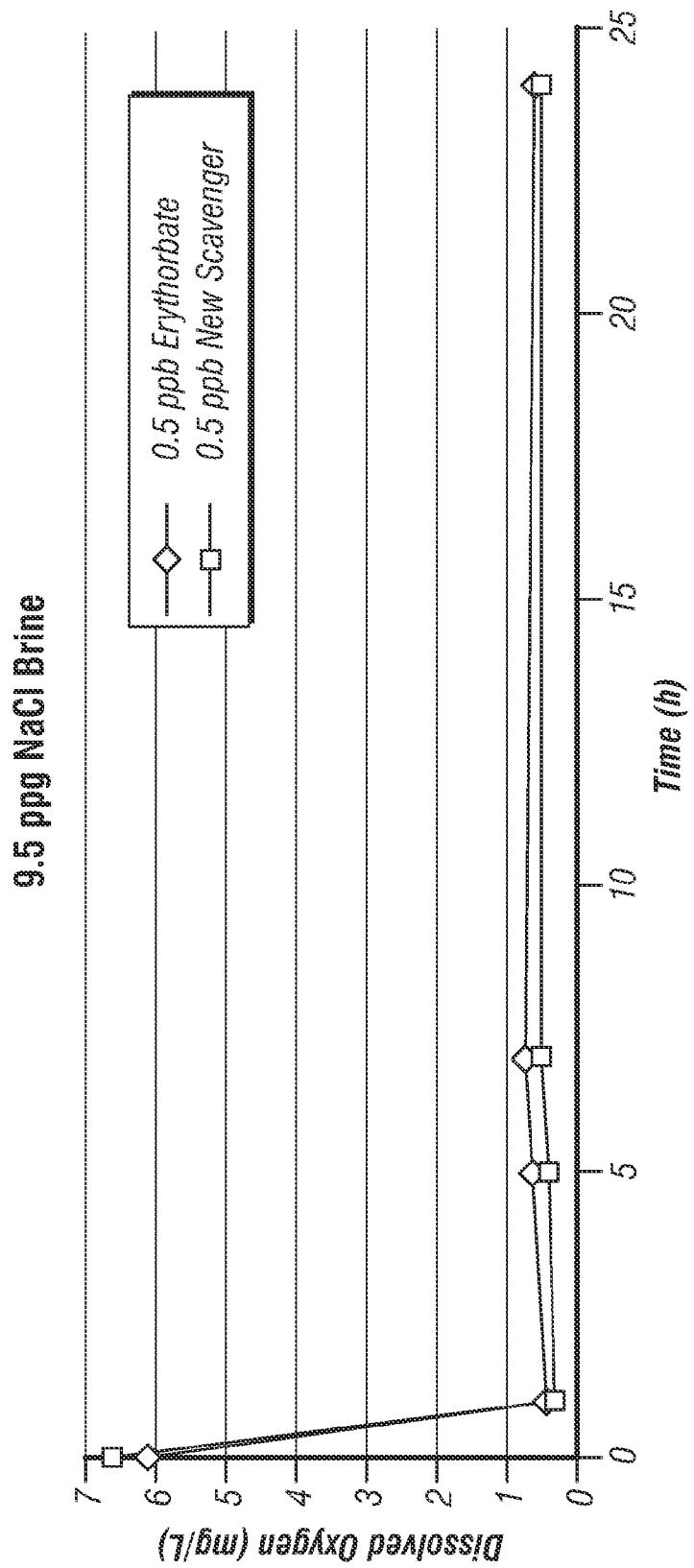
FIG. 1 is a graph comparing the removal of dissolved oxygen from a 9.5 lb/bbl sodium chloride brine over a 24 hour period at room temperature by 0.5 lb/bbl oxygen scavenger of the invention and by 0.5 lb/bbl oxygen scavenger consisting of erythorbate.

The present invention provides an oxygen scavenger for aqueous completion fluids that is effective at reducing the level of oxygen in the fluid during a completion operation even at high temperatures without causing problematic precipitation or discoloration of the fluid.

The oxygen scavenger of the invention comprises a blend of erythorbate and alkylhydroxylamine. Without wishing to be limited by theory, it is believed that the alkylhydroxylamine and erythorbate blended together for use in the completion fluid, which is most preferably a clear and colorless brine, have a synergistic effect in the fluid, wherein the alkylhydroxylamine imparts stability to the erythorbate at high temperatures. At temperatures encountered in a subterranean formation of about 275° F. or higher, even as high as 500° F., the erythorbate in the oxygen scavenger of the invention does not appear to break down—the completion brine remains clear and colorless. The alkylhydroxylamine, as well as the erythorbate, is believed to be scavenging oxygen.

Any alkylhydroxylamine is believed suitable for use in the present invention. Examples include, without limitation, isopropylhydroxylamine, diethylhydroxylamine, tert-butylhydroxylamine, phenylhydroxylamine, cyclohexylhydroxylamine, and benzylhydroxylamine. The many possibilities for the various alkylhydroxylamines that may be used is appreciated from the following example structures:

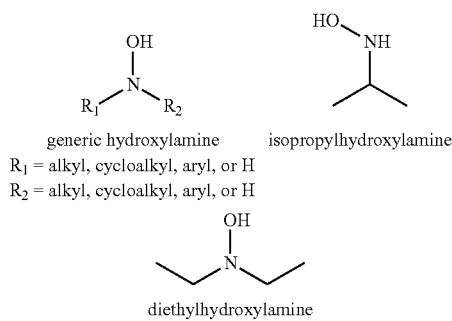

generic hydroxylamine
$R_1$ = alkyl, cycloalkyl, aryl, or H
$R_2$ = alkyl, cycloalkyl, aryl, or H isopropylhydroxylamine diethylhydroxylamine Erythorbic acid, ascorbic acid or ascorbate may be substituted for erythorbate in the invention.

An experiment was conducted where 1.0 lb/bbl oxygen scavenger of the invention containing a blend of about 10% w/w erythorbate (0.1 lb/bbl) and 90% w/w alkyhydroxylamine solution (0.9 lb/bbl) was added to samples of 9.5 lb/gal sodium chloride brine, and compared to brine samples containing 0.5 lb/bbl erythorbate alone as an oxygen scavenger. The samples containing the scavenger of the invention remained clear and colorless, even after aging for as much as 16 hours at 300° F., 400° F., and even 500° F. The samples containing the scavenger consisting only of erythorbate, turned opaque and brown. The experiment was repeated with these oxygen scavengers in an 11.0 lb/gal calcium chloride brine and in a 15.5 lb/gal calcium bromide/zinc bromide brine and the same results were seen. The brine samples containing the scavenger of the invention remained clear and colorless at 300° F., 400° F., and even at 500° F., whereas the brine samples containing the scavenger of only erythorbate turned brown and opaque at 300° F. and remained so at the higher temperatures.

A similar experiment was conducted with a 3.0 lb/bbl oxygen scavenger of the invention containing about 10% w/w erythorbate (0.3 lb/bbl) and 90% w/w (2.7 lb/bbl) alkylhydroxylamine solution added to samples of 9.5 lb/gal sodium chloride brine. For comparison, oxygen scavenger containing only 0.25 lb/bbl sodium erythorbate was added to other samples of 9.5 lb/gal sodium chloride brine. All of the samples were heated for 16 hours at 300° F. The samples containing the scavenger of the invention remained clear and colorless. The samples containing the scavenger having only the sodium erythorbate turned dark and opaque.

These experiments demonstrate a synergistic effect whereby the alkylhydroxylamine is providing a stabilizing effect to the erythorbate.

Figure 2:
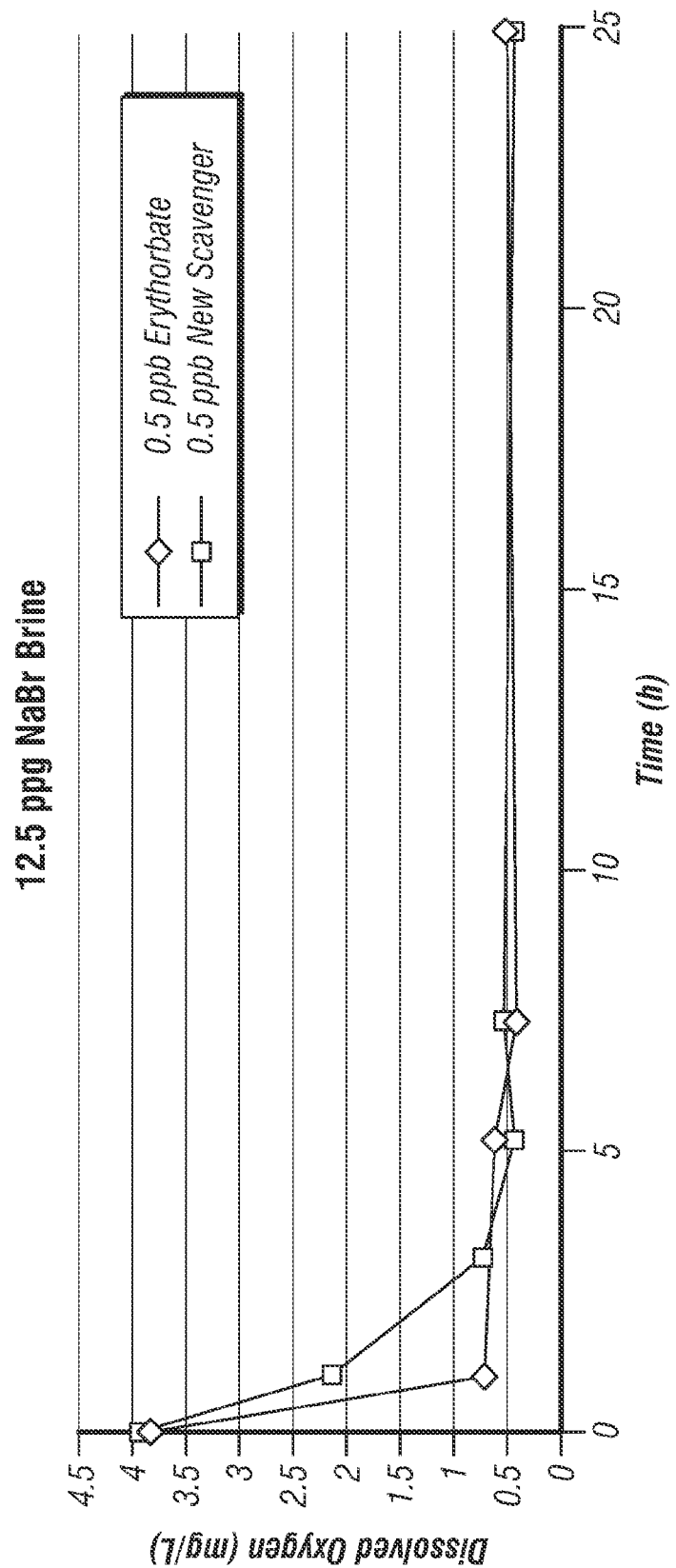
FIG. 2 is a graph comparing the removal of dissolved oxygen from a 12.5 lb/bbl sodium bromide brine over a 24 hour period at room temperature by 0.5 lb/bbl oxygen scavenger of the invention and by 0.5 lb/bbl oxygen scavenger consisting of erythorbate.
Figure 3:
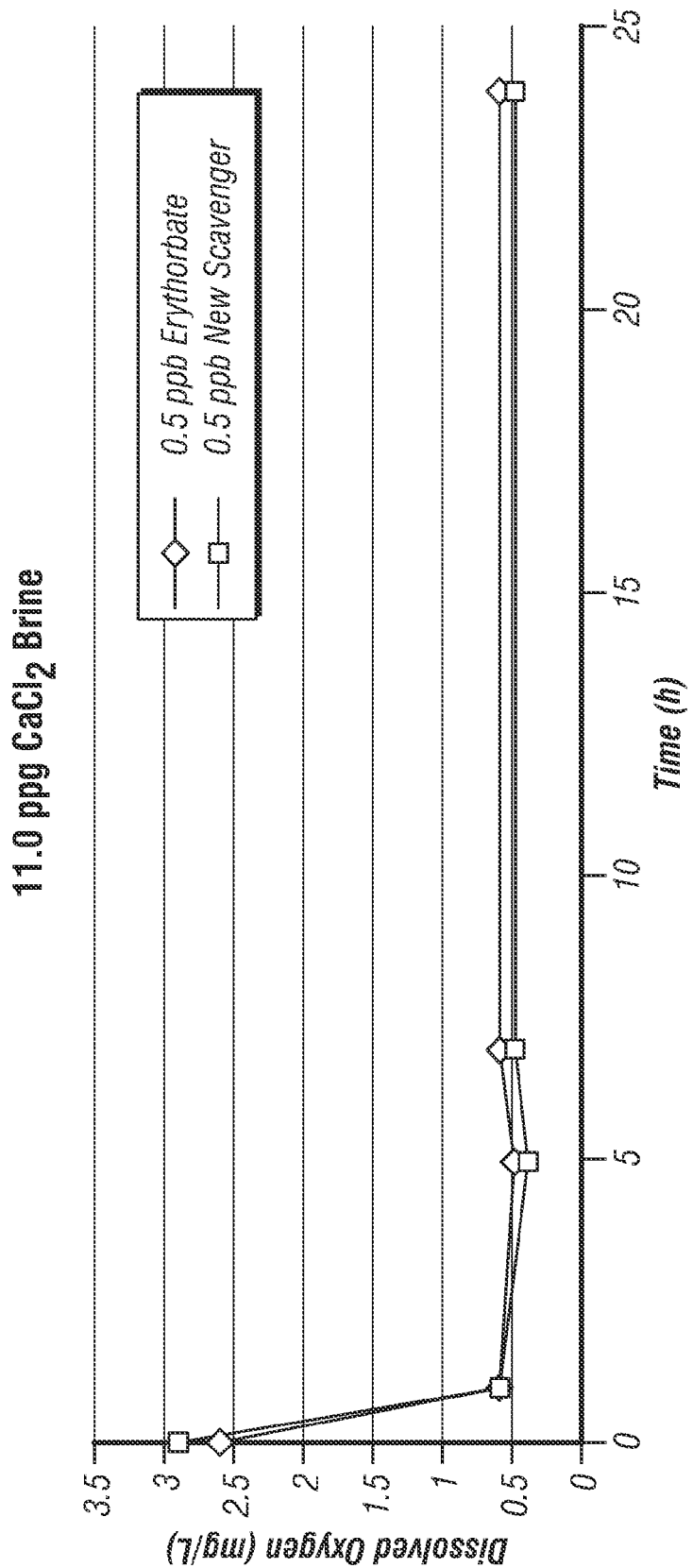
FIG. 3 is a graph comparing the removal of dissolved oxygen from a 11.0 lb/bbl calcium chloride brine over a 24 hour period at room temperature by 0.5 lb/bbl oxygen scavenger of the invention and by 0.5 lb/bbl oxygen scavenger consisting of erythorbate.
Figure 4:
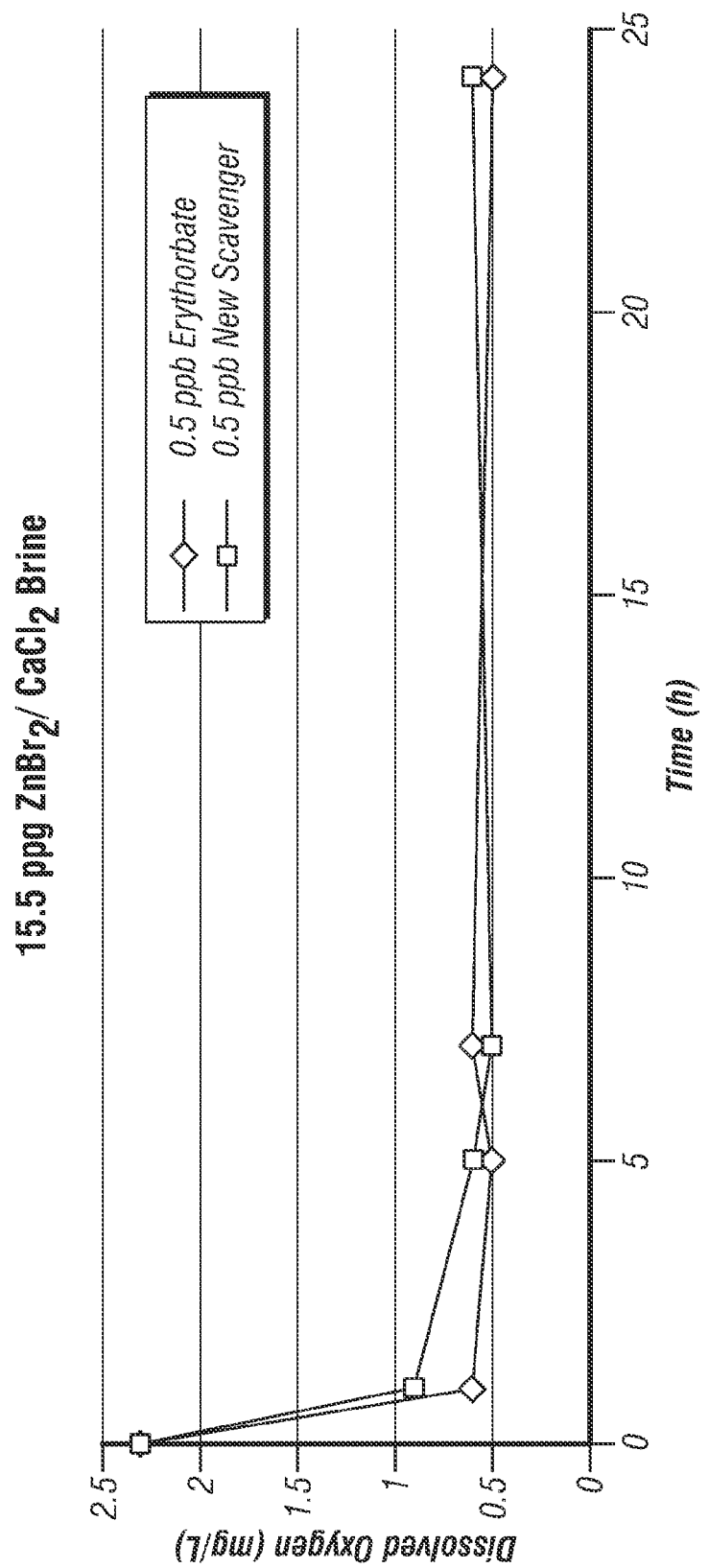
FIG. 4 is a graph comparing the removal of dissolved oxygen from a 15.5 lb/bbl zinc bromide/calcium bromide brine over a 24 hour period at room temperature by 0.5 lb/bbl oxygen scavenger of the invention and by 0.5 lb/bbl oxygen scavenger consisting of erythorbate.

Further experiments were conducted to test the effectiveness of the oxygen scavenger of the invention in scavenging oxygen in completion brines. Oxygen scavenger containing only 0.5 lb/bbl erythorbate and oxygen scavenger containing 0.5 lb/bbl scavenger of the invention containing a blend of 0.1 lb/bbl erythorbate and 0.9 lb/bbl alkylhydroxylamine solution were added to different samples of 0.5 lb/bbl sodium chloride brine, 12.5 lb/bbl sodium bromide brine, 11.0 lb/bbl calcium chloride brine and 15.5 lb/bbl zinc bromide/calcium bromide brine. The amount of dissolved oxygen was measured in the samples over a 24 hour period at room temperature (approximately 70° F.). Room temperature was selected for these experiments because oxygen becomes less soluble as temperature increases. Also, generally, or usually, oxygen scavengers are added to completion fluids, and dissolved oxygen levels are measured in completion fluids, before they are placed in a wellbore. A YSI Model 55 Dissolved Oxygen Meter and an Extech Dissolved Oxygen Meter were used for the measurements of dissolved oxygen. These simple instruments have a probe and a digital readout similar to a pH meter. A colorimetric test kit for dissolved oxygen, such as one offered by CHEMetrics might alternatively be used. The results of these experiments are shown in FIGS. 1-4. In each case, the scavenger of the invention provided comparable results to the scavenger containing only erythrobate.

The amount of oxygen scavenger of the invention needed for such oxygen removal depends on the amount of oxygen present in the aqueous fluid. In general, about 0.5 lb/bbl to about 3.0 lb/bbl of the scavenger is effective for completion operations. The scavenger may be added to the fluid during preparation of the fluid and/or at the beginning or a completion operation and/or during a completion operation.

Brines comprising the oxygen scavenger of the invention may effectively be used in drilling through a producing zone of a high temperature subterranean formation, or in working over a wellbore penetrating a high temperature subterranean formation as well as in traditional operations for completing a wellbore in a high temperature subterranean formation, operations such as penetrating a wellbore casing and installing pipes and pumps to facilitate production from the subterranean formation through the wellbore. The oxygen scavenger of the invention is similarly effective in subterranean formations not having high temperatures (or temperatures greater than about 275° F.) but its advantages are particularly appreciated in high temperatures, because the scavenger does not break down and a colorless, clear brine remains colorless and clear.

The foregoing description of the invention is intended to be a description of preferred embodiments. Various changes in the details of the described fluids and methods of use can be made without departing from the intended scope of this invention as defined by the appended claims.

What is claimed is:

1. An aqueous completion fluid comprising: brine that is clear and colorless; and an oxygen scavenger comprising a blend of alkylhydroxylamine and a compound selected from the group consisting of: erythorbate; ascorbate; ascorbic acid; and erythorbic acid, the fluid remaining clear and colorless having an NTU (nephelometric turbidity unit) of less than about 20 at temperatures of about 275° F. to about 500° F.

2. The fluid of claim 1 wherein the fluid has an oxygen content of less than about 1 mg/L at temperatures of about 275° F. to about 500° F.

3. The fluid of claim 1 wherein the fluid has an oxygen content of less than about 0.5 mg/L at temperatures of about 275° F. to about 500° F.

4. The fluid of claim 1 wherein the alkylhydroxylamine is selected from the group consisting of isopropylhydroxylamine, diethylhydroxylamine, tert-butylhydroxylamine, phenylhydroxylamine, cyclohexylhydroxylamine, and benzylhydroxylamine.

5. The fluid of claim 1 wherein the oxygen scavenger comprises a blend of 0.01% w/w to 75% w/w of the compound and 25% w/w to 99.9% w/w of a solution comprising the alkylhydroxylamine.

6. The fluid of claim 5 wherein the compound comprises erythorbate.

7. The fluid of claim 1 wherein the oxygen scavenger comprises a blend of 10% w/w of the compound and 90% w/w of a solution comprising the alkylhydroxylamine.

8. The fluid of claim 7 wherein the compound comprises erythorbate.

* * * * *